United States Patent [19]
Arnold et al.

[11] Patent Number: 5,905,719
[45] Date of Patent: May 18, 1999

[54] METHOD AND SYSTEM FOR WIRELESS INTERNET ACCESS

[75] Inventors: Hamilton Webster Arnold, Neptune; Li-Fung Chang, Holmdel; Ravi Kumar Jain, Hoboken; Kenneth White Leland, Middletown; Robert Conrad Malkemes, Bricktown; Joseph Frank Rizzo, Lincroft, all of N.J.

[73] Assignee: Bell Communications Research, Inc., Morristown, N.J.

[21] Appl. No.: 08/717,734

[22] Filed: Sep. 19, 1996

[51] Int. Cl.$^6$ ............................................. H04Q 7/00
[52] U.S. Cl. ............................................. 370/330; 370/476
[58] Field of Search ............................ 370/276, 277, 370/278, 280, 281, 294, 313, 314, 328, 329, 330, 466, 467, 468, 474, 476, 478, 436; 395/200.09, 200.2, 200.06

[56] References Cited

U.S. PATENT DOCUMENTS

| | | | |
|---|---|---|---|
| 5,673,322 | 9/1997 | Pepe et al. | 380/49 |
| 5,687,194 | 11/1997 | Paneth et al. | 375/283 |
| 5,721,827 | 2/1998 | Logan et al. | 395/200.47 |
| 5,732,216 | 3/1998 | Logan et al. | 395/200.33 |

*Primary Examiner*—Ajit Patel
*Attorney, Agent, or Firm*—Joseph Giordano; David A. Hey; James W. Falk

[57] ABSTRACT

Disclosed are a system and method for providing wireless access to a network, such as the internet. The disclosed technique takes into account the inherent asymmetric and bursty characteristics of internet communication to obtain more efficiency in the communication between a user and an access provider. In doing so, the invention provides a technique that can be used to economically provide wireless access to the internet at data rates that are comparable to what a user would receive over ISDN lines.

13 Claims, 3 Drawing Sheets

METHOD AND SYSTEM FOR WIRELESS INTERNET ACCESS

FIELD OF THE INVENTION

The present invention relates to the field of wireless data communication. In particular, the invention relates to a system and method for high speed wireless access to a wide area network such as the internet.

BACKGROUND OF THE INVENTION

Typically, access to what is commonly referred to as "the internet" requires a data channel between a user terminal and an access provider. The access provider serves as a gateway for exchange of data between the user terminal and the various nodes which together comprise the internet.

Many types of connections between the customer and an access provider are now available, each characterized by varying levels of convenience, expense and transmission efficiency. Currently, most residential users access the internet with a conventional modem that operates at speeds up to 28.8 kilobits per second (Kbps). Such users access an internet service provider or an online service provider by establishing a circuit-switch connection through the public switched telephone network (PSTN). Point-to-point protocol (PPP) sessions to the internet access point are maintained during the duration of the circuit switch connection.

Integrated Services Digital Network (ISDN) lines are increasingly being used to access the internet with a much faster transmission speed than provided by conventional 28.8 Kbps modems. In the future, ADSL modems and cable modems are likely to offer alternative means for accessing the internet.

Primarily due to the increased use of mobile terminals, such as "laptop" or portable computers, there is an increasing demand for access to the internet from areas in which no wire terminal is accessible to the user. Some cellular systems attempt to meet this need by providing wireless internet access. For example, CDPD (Cellular Digital Packet Data) is a packet data mode for analog cellular systems which provides data transmission suitable for access to the internet. Other wireless networks, such as GSM, are also becoming available which support communication through the internet.

While providing greater convenience in terms of user mobility, conventional wireless networks are limited in significant respects. For example, they generally are expensive relative to communication over standard telephone lines. Moreover, they are characterized by a relatively low data transmission rate (typically between 9.6 and 19.2 Kbps). Further, even yet-to-be implemented systems are relatively inefficient with respect to usage. For example, GSM will require 200 Khz spacings on both uplink and downlink, thus permitting only twenty-five frequency channels in a 10 MHz system.

In summary, among the above-described conventional methods for accessing the internet, communication by modem over the PSTN is relatively inexpensive, but lacks the high speed offered by ISDN lines or the convenience of wireless cellular networks. ISDN lines provide greater efficiency through faster transmission rates, but are more expensive than a standard telephone connection and, again, less convenient to use than wireless cellular systems. While more convenient, wireless communication is limited in terms of both cost and transmission speed.

In view of the foregoing, there is a need to provide a system and method for accessing the internet which provides the speed of ISDN based systems and the convenient accessibility afforded by wireless systems while preserving spectral efficiency.

SUMMARY OF THE INVENTION

It is an object of the invention to meet the above described need and others and to overcome the limitations which characterize prior art techniques for providing internet access. It is a related object of the invention to provide wireless access to the internet at data rates that are comparable to what the customer would receive over an ISDN line (i.e., 64 Kbps, with options up to 128 Kbps and 256 Kbps). It is a further object of the invention to provide a technique for wireless data transmission so that the transmissions among many users can be statistically multiplexed onto a single radio frequency, and more bandwidth may be allocated to the downlink (internet to user) in order to account for the asymmetric nature of the data transmission.

In fulfillment of these objects of the invention, our invention is a system and method of providing wireless access to a network, such as the internet. As embodied and described below, the invention may comprise the steps of:

wirelessly transmitting an electromagnetic signal containing identification information from a user terminal to a base station;

assigning a predefined frequency range and time slot for data transmission between the user terminal and the base station; and at the user terminal, segmenting data of a first format, such as TCP/IP, into frames of a predetermined length and transmitting the data from the user terminal to the base station at the assigned frequency range and time slot;

at the base station, receiving the segmented data from the user terminal; and recombining the segmented data received from the user terminal into the first format and providing the recombined data to a network.

For downloading data from the base station to the user terminal, the method of the invention further includes the steps of:

receiving data in the first format from the network and at the base station, segmenting the received data from the network into the frames of the predetermined length, and transmitting the segmented data from the base station to the user terminal at a preassigned frequency range and time slot; and at the user terminal, receiving the segmented data from the base station; and recombining the segmented data received from the base station into the first format.

According to a feature of the invention, the user terminal transmits and receives data with a wireless modem.

According to another feature of the invention, the segmented data is transmitted and received in a Time Division Duplex format.

According to still another feature of the invention, data transmitted from the base station to the user terminal is allocated a larger portion of each of the frames than allocated to data which is transmitted from the user terminal to the base station. For example, the ratio per frame of data transmitted from the base station to the user terminal to data transmitted from the user terminal to the base station may be four to one.

According to yet another feature of the invention, the frequency range and time slot are assigned according to a likely number of users of the network, a likelihood of the users of the network actively communicating information at a given time, and a likelihood of the users transmitting versus receiving data. According to particular embodiments incorporating these features, the likelihood of the users transmitting versus receiving data may be one to four, and the likely number of users may be ⅛ the number of potential users.

According to still another feature of the invention, the network comprises the internet.

Additional objects, advantages and novel features of the invention will be apparent to those skilled in the at from the following description.

DETAILED DESCRIPTION OF THE PREFERRED EMBODIMENT

As described more fully below, the invention takes into account the inherent characteristics of internet communication to obtain more efficiency in the communication between a user and an access provider. In doing so, the invention provides a technique that can be used to economically provide wireless access to the internet at data rates that are comparable to what a user would receive over ISDN lines.

Typical communication over the internet is bursty and asymmetric. It is "bursty" in the sense that data is actually transmitted or received over only a relatively small portion of the time during which a user is connected to the internet through an active channel. It is asymmetric since the user receives a significantly larger amount of data than he or she transmits (typically less than 20% of the data communicated is transmitted by the user).

For example, when a user browsing the World Wide Web requests a web page, only a relatively small amount of data is transmitted. In order to display the graphics and images which comprise the web page to the user, a large amount of data is received by the user. As this process is repeated, a large portion of the session consists of holding time during which no data is transmitted or received.

The invention takes into account these features to provide a more efficient system and method of accessing the internet. As made apparent from the examples below, the inventive technique uses packet data transmission so that transmission to and from many users can be statistically multiplexed onto a single radio frequency. The technique according to the invention allocates more bandwidth to the downlink (internet to user) to account for the asymmetric nature of the data transmission.

Figure 1:
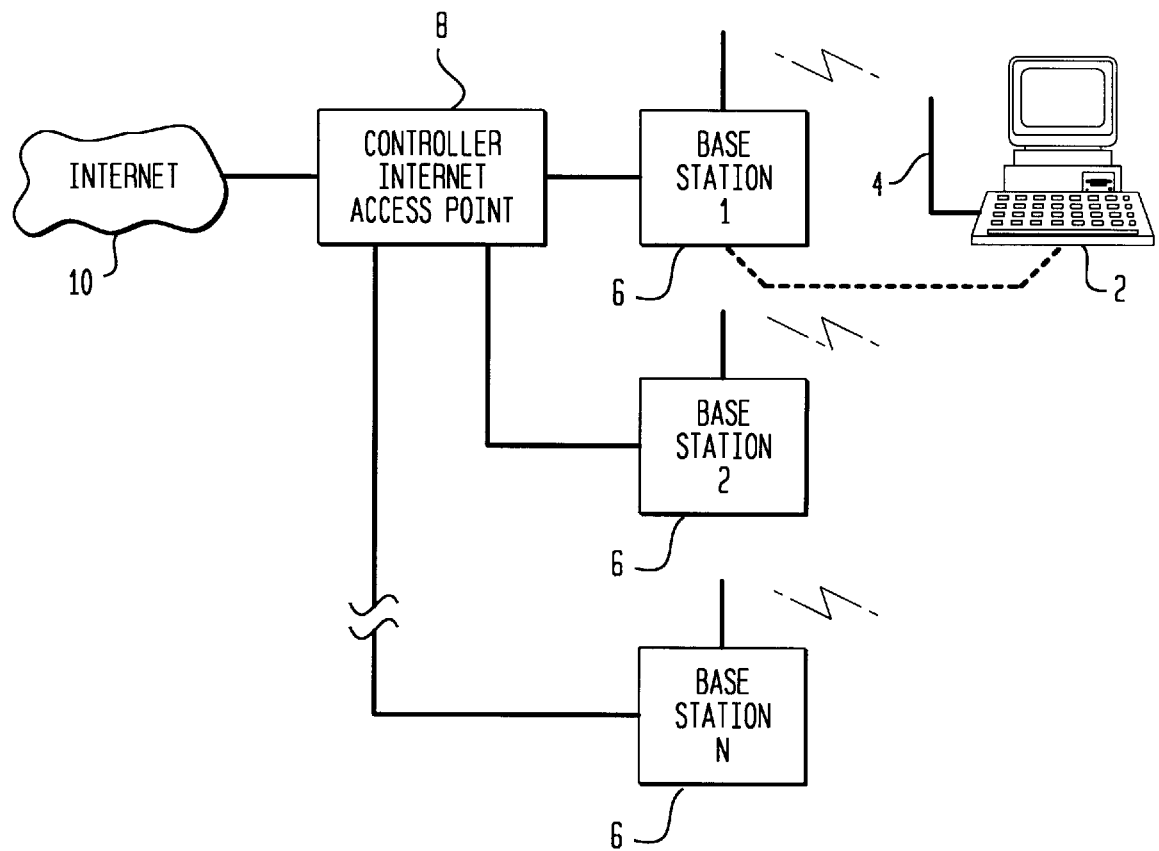
FIG. 1 is a block diagram of a system for wireless access to the internet in accordance with an embodiment of the invention.

FIG. 1 illustrates a wireless internet access service system in accordance with an embodiment of the invention. A user terminal 2, such as a portable computer, is provided with a wireless modem 4. As generally known in the art, the wireless modem 4 incorporates an antenna and a radio transceiver to modulate baseband data streams onto a radio frequency carrier so they can be transmitted and received.

A plurality of base stations 6, illustrated as BASE STATION 1 to BASE STATION N, are each connected by a single T1 line to a controller and internet access point 8. The base stations 6 demodulate signals received from one or more user terminals and relay the received information to the controller and internet access point 8. The controller and internet access point 8 is connected to a network 10, such as the internet. While illustrated with a single block, it will be understood that several components may in fact comprise the controller and internet access point 8.

In this particular embodiment of the invention, the base station 6 operates at relatively high power, for example, providing a cell site that covers an approximately sixteen square mile area and permits communication with user terminals at a distance of up to three miles. Assuming, for example, that the service provider has 10 MHz of spectrum available, each cell could support about 1,000 subscribers before the customers would begin to experience data rates on the downlink which are lower than 64 Kbps and on the uplink rates which are lower than 16 Kbps. Thus, with such an embodiment, only about ten cells would be needed to cover most of the population in a county the size of Monmouth County, N.J.

While a high power system is illustrated in which a relatively small number of base stations service a relatively larger number of users distributed over a wide geographic area, it will be appreciated that this is merely an example of the invention. The invention could easily be applied in conjunction with a (faster) low power system in which a larger number of low power base stations each service a smaller number of users.

The design of the system illustrated in FIG. 1 is very flexible in that the number of traffic channels available in each cell depends on the total spectrum available to the operator. As described more fully below, each traffic channel transmits data over the air at 106.67 Kbps in a Time Division Duplex (TDD) format. Within each frequency channel, 64 Kbps of user data can be transmitted on the downlink (base station to user terminal). About 16 Kbps can be transmitted on the uplink (user terminal to base station). As a result, this example utilizes a four to one ratio (64 to 16) to take advantage of the asymmetry of internet traffic. Of course, it will be appreciated that this is merely a system constant which can be adjusted if it is found that the traffic becomes more symmetric over time, as might be the case if voice is routinely transmitted over the internet as IP (internet protocol) packets.

In this example, the base stations are deployed with a frequency reuse pattern of seven, so that each frequency can be reused in every seventh cell. Thus, a minimum sized system would require one traffic channel, and perhaps one control channel, per cell or a total of (80 KHz)×2×7=1.12 MHz. The operator can add traffic channels to the system in increments of (80 KHz) ×7=560 KHz. Consequently, an operator with a 10 MHz PCS (personal communication system) license could implement sixteen traffic channels and one control channel in each cell, which would use 9.52 MHz of the 10 MHz (7×17×80 KHz).

Figure 2:
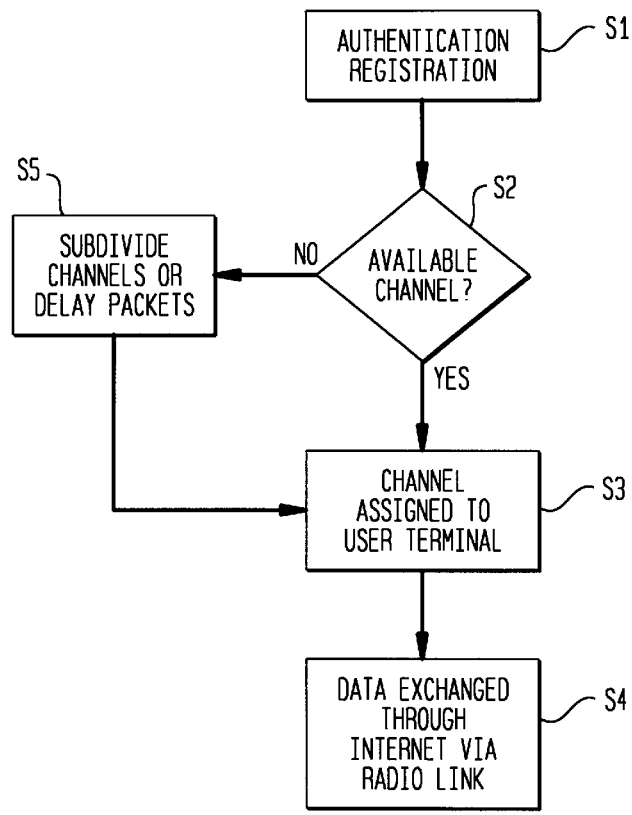
FIG. 2 is a flow diagram which generally describes the basic operation of the system of FIG. 1.

The general operation of the above described system is now explained in reference to FIG. 2. When a customer turns on the user's terminal and attempts to access the internet over this system, at step S1, registration and authentication messages are exchanged between the controller and the customer's PC over the control channel in a manner similar to that for wireless voice communications. Specifically, the user's terminal will attempt to contact the base station over a predefined control channel. The user terminal will provide some type of authentication information which the base station relays to the controller for verification.

If the user is verified, then the system will determine at step S2 if any frequency channel is available. For example, in the system described above in which sixteen data channels are available and one control channel, if any of the sixteen frequency channels are unused, at step S3 the system will assign an available frequency to the user terminal and command the wireless modem in the user's PC to transmit and receive packet data over the available frequency channel at step S4. In the case of a single user, the user will be able to receive data at the full channel rate of 64 Kbps and can transmit data at 16 Kbps.

If all of the frequency channels are being used by customers, the system will select the most lightly loaded channel and instruct the user's wireless modem to transmit and receive packets over that channel. If, at the time the user receives or transmits data none of the other users are receiving or transmitting data, then the entire downlink and uplink bandwidth is made available to the user for transmission of packets. If other users are receiving or transmitting data at the same time, then the system will further subdivide the bandwidth on the channel for simultaneous transmission of packets to and from multiple users, up to a maximum of eight simultaneous users. Accordingly, the data rate seen by the users under this condition will be less than 64 Kbps on the uplink and 16 Kbps on the downlink.

As illustrated generally at step S5, if the system is very heavily loaded such that more than eight users are simultaneously transmitting or receiving packets, then the system will delay transmission of the packets, in addition to dividing up the bandwidth, so the user will experience yet a lower data throughput rate. As users terminate their sessions, the system will redistribute active users over the frequency channels in order to maximize the data rates seen by the users. It is also possible that, by monitoring usage by each customer, the system will swap a light user on a lightly-loaded channel with a heavy user on a more heavily-loaded channel.

Based on current trends, it is estimated that ⅛ of the customers with access to the internet will be on active sessions during the busy hour, and that ⅛ of the time an active user will be transmitting or receiving information. Thus, a single base station with sixteen traffic channels available can support 8×8×16=1024 customers before those customers begin to experience lower downlink rates than 64 Kbps and lower uplink rates than 16 Kbps, on average. If the operator has fewer than sixteen traffic channels per base station, for example, eight channels, the system can still handle 1024 customers, but the active users will experience lower data rates during a busy hour.

Being able to handle at least 1000 customers per base station is important because a sixteen square-mile cell in a reasonably populated area would cover about 35,000 households. At a 3% penetration level, this results in about 1000 customers per base station. If the penetration level increases beyond 3% and the operator is limited to 10 MHz of spectrum, then customers will experience lower data rates during a busy hour; however, slightly lower rates may be perfectly acceptable.

With the system described above, the customer may also be provided with options to receive data at 128 Kbps or 256 Kbps by receiving the data on multiple frequency channels (two for 128 Kbps and four for 256 Kbps). In that case, the data in TCP/IP packets to the customer would be transmitted simultaneously over two or four frequency channels, accordingly. Since these data rates impact system capacity, the operator would presumably charge considerably more for these higher-data-rate options.

Figure 3:
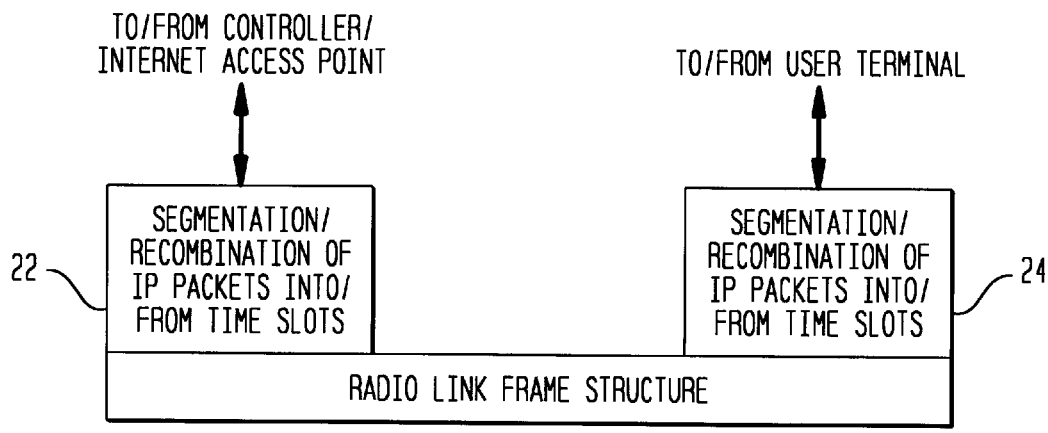
FIG. 3 is a diagram of the functionality of the base station and wireless modem shown in the system of FIG. 1.

Data link layer software in the controller and the user's wireless modem in the PC is responsible for taking TCP/IP packets and segmenting them such that they are transmitted in the appropriate time slots over the radio link described below. This software is also responsible for recombining the data transmitted over the radio link into IP packets that are delivered to applications in the user's PC or to the internet. This is depicted at a high level in FIG. 3. In this example, the right side of FIG. 3, designated with reference 24, describes functionality performed in the wireless modem provided in the user's PC and the left side, designated with reference 22 describes the functionality performed in the base station.

As shown by reference 24, during transmission, the wireless modem receives data from an internal bus in the PC in a standard TCP/IP format, segments the received TCP/IP packets into the frame structure described below, and transmits the packets of data to the base station over the radio link during a predefined time slot assigned by the controller. During reception, the wireless modem receives data from the base station during a predefined time slot, recombines received TCP/IP packets, and provides the TCP/IP packets to the PC bus.

The base station communicates through a standard line with the controller/internet access point and communicates through a radio link with the user terminal. During reception, the base station receives segmented TCP/IP data in the frame structure described below over the radio link with one or more user terminals. The TCP/IP data packets are recombined and provided to the controller. During transmission, the base station receives TCP/IP data packets from the controller/internet access point, segments the received TCP/IP packets into the frame structure described below, and transmits the segmented data to registered users over the radio link during a preassigned time.

Figure 4:
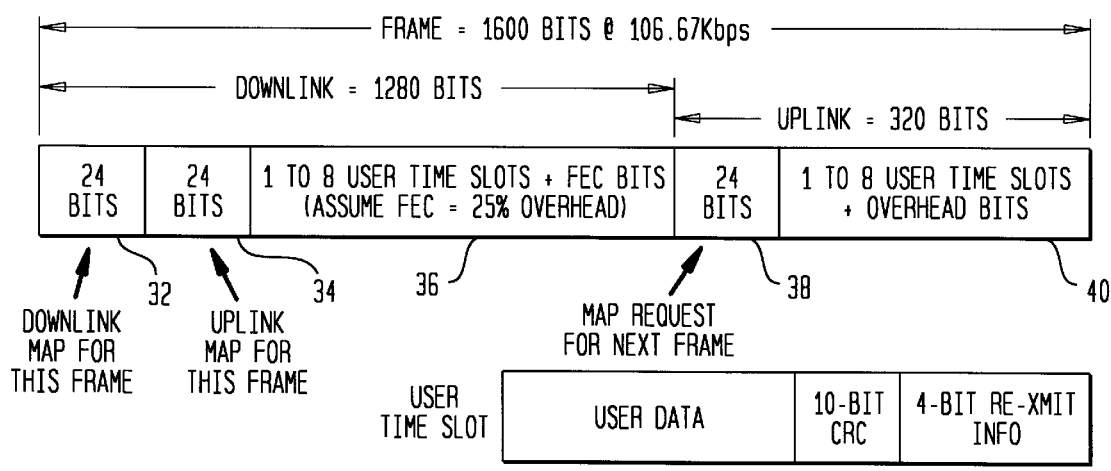
FIG. 4 is a diagram of a frame structure for the radio link illustrated in the system of FIG. 1.

FIG. 4 generally describes a frame structure of data provided over the radio link between the base station and the user terminal. The system is based on a Time Division Duplex structure in which the downlink and uplink bit streams are transmitted at the same frequency (as opposed to Frequency Division Duplex, or FDD, which transmits the downlink and uplink on different frequencies and which is commonly used in cellular voice communications systems).

In this example, an entire frame consists of 1600 bits and takes 15 milliseconds. 1280 bits of each frame are provided to the downlink. 320 bits are available for the uplink. Thus, this embodiment is adapted to better conform to actual internet usage in which a greater amount of information is transmitted from the base station to the user (i.e., during the downlink) than from the user terminal to the base station (i.e., during the uplink).

The 1280 downlink bits include a twenty-four bit map 32 that describes the downlink structure for this frame (i.e., which users are assigned to which time slot within the downlink), a twenty-four bit uplink map 36 for this frame, and 1232 bits for user data plus forward error correction (FEC) 36. In this example, the FEC uses 320 bits (25% of 1280) leaving 912 bits for actual user data (consisting of the segmented TCP/IP packets). However, if there is only one user for this frame, then the twenty-four bit downlink and uplink maps 32 and 34 are not needed, leaving 960 bits for user data which results in 64 Kbps of user data (960/0.015). If there are multiple users in this frame, the 912 bits are divided into eight time slots of 114 bits each, and user data is transmitted in one or more of these time slots up to a maximum of eight users.

The 320 bits for the uplink include a twenty-four bit map 38 request for the following frame (i.e., which users are contending for what time slots on the next frame), and up to eight time slots for user data plus overhead bits 40 (which consists of a 10-bit cyclic redundancy check, or CRC, and 4 bits for additional error correction). As with the downlink, if there is only one user of the frequency channel, the twenty-four bit uplink map 38 is not needed, resulting in user data of 306 bits in this frame (320–10–4) and a data rate of 20.4 Kbps (306/0.015). If there are eight users in a particular frame, the data transmitted per user is twenty-three bits, which would results in a data rate of 1.533 Kbps.

Figure 5:
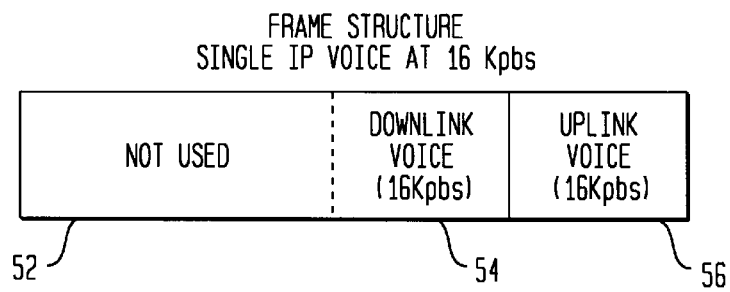
FIG. 5 is a diagram of a frame structure for a single IP voice user at 16 Kbps.

Users who transmit voice contained in TCP/IP packets will be transmitting and receiving data at the same rate as non-voice data (e.g., at 16 Kbps). Since the radio link described above assumes asymmetric data transmission (i.e., more data on the downlink than the uplink), special processing must be done to handle the symmetric case, as may occur with voice transmission. Assuming voice transmission at 16 Kbps, the system will transmit the information as depicted in FIG. 5, in which the entire frequency channel is used by a single customer while voice is being transmitted or received. In FIG. 5, the uplink voice 56 utilizes 16 Kbps of the uplink allocated portion of the packet, and the downlink voice 54 uses 16 Kbps of the downlink allocated portion of the packet, leaving the remaining bits in an unused portion 52.

Figure 6:
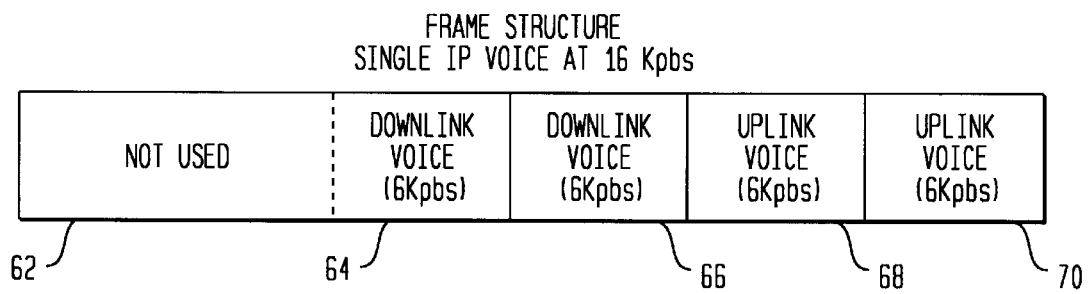
FIG. 6 is a diagram of a frame structure for two IP voice users at 6 Kbps.

As can be seen from FIG. 6, the downlink in this case is used inefficiently. In this example, two customers are transmitting or receiving voice simultaneously at, for example, 6 Kbps, utilizing the entire uplink allocated portion of the packet, but only a small part of the downlink portion of the packet. The remainder 62 of the downlink portion of the packet is unused.

If the number of customers who require symmetric transmission for voice and/or other applications (such as two way video) becomes a significant fraction of the overall customer base, then the operator would be able to adjust the boundary between the uplink and the downlink on a systemwide basis to be more symmetrical, and thereby more efficiently use the frequency channels. This cannot be done on a cell-by-cell basis because of potential harmful interference from cell to cell (i.e., the TDD nature of the system means that all cells must be transmitting on the downlink or receiving on the uplink at the same time). However, it may be conveniently implemented centrally with the controller.

Figure 7:
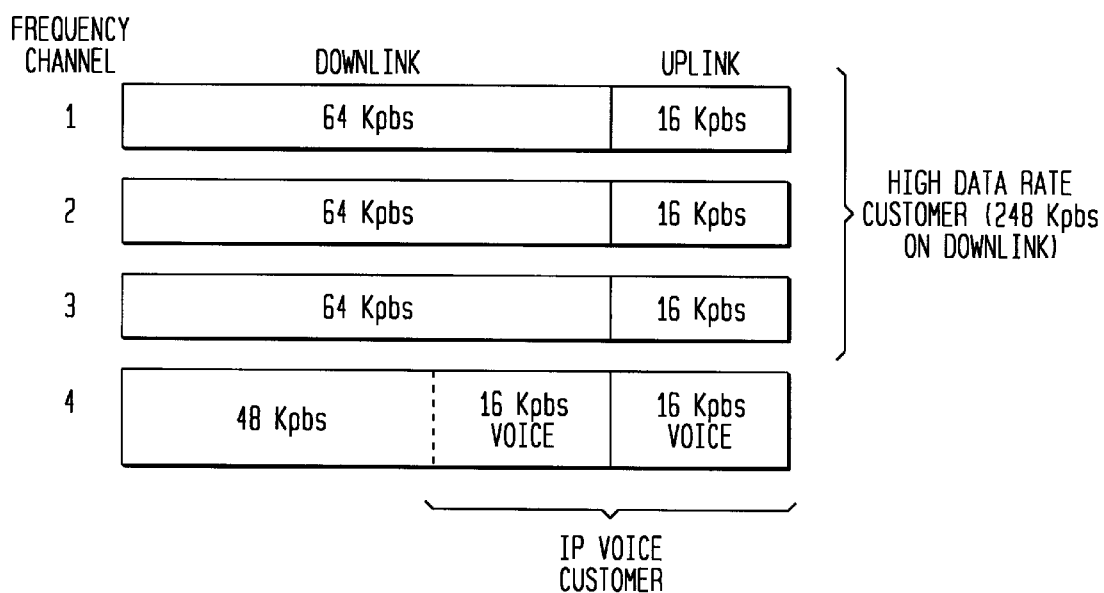
FIG. 7 is a diagram of multiple channel assignments to support simultaneously both high data rate and IP voice customers.

Customers who desire downlink transmissions greater than 64 Kbps (for example, at rates up to 256 Kbps) will utilize more than one frequency channel. Additional software in the controller and in the customer's wireless modem in the PC will further fragment the TCP/IP packets across the frequency channels and transmit those packets simultaneously to realize the higher data rates. However, the system is designed to utilize the unused downlink bandwidth from IP voice users to support the higher data rate transmissions to customers, as depicted in FIG. 7 which illustrates a high data rate customer using both the uplink and downlink portions of frequency channels 1 to 3 and a part of the downlink portion of frequency channel 4. The TCP/IP voice user uses the uplink portion of frequency channel 4 and part of the downlink portion of frequency channel 4 for efficiency. The high data rate user may only realize 240 Kbps downlink rates in such a situation, but this is a negligible difference.

The invention has now been described by reference to specific examples in fulfillment of the objects set forth. It will be apparent from this description that the design according to the invention is simple and therefore inexpensive. Such a technology could enable customers to drop second lines that have been obtained for internet access, while also allowing access to the internet from many locations outside the home. The invention also enables internet service providers to avoid switch congestion by completely bypassing the switch.

Because the system described here is tailored to provide wireless internet access over wide areas, it is extremely efficient and economical. Unlike most other wireless technologies, the system is not designed to support voice communications (other than IP voice), so it is much simpler in that regard. It is also high power in nature so it can cover a wide area with very few cells, making it easy and inexpensive to get into business. Perhaps most importantly, it is very spectrally efficient. That is, because the radio link only operates at 106.67 Kbps in a TDD mode, it only requires 80 KHz channel bandwidths. Thus, many frequency channels can be packed into a few MHz of spectrum. Comparing this, for example, to GSM (which in the future will also be able to support packet radio transmission over multiple time slots) which requires 200 KHz channel spacings on the uplink and downlink separately (GSM is an FDD system) means that GSM will have much less capacity to support internet traffic than the system described here. In 10 MHz, the system described here can provide 125 frequency channels, while GSM can only provide twenty-five. Since each channel can support the same number of users, the capacity of the system described here is greater than GSM by a factor of five, which translates into much lower cost. Finally, this system is designed to optionally support downlink data rates of up to 256 Kbps if the customer so chooses.

While specific examples of the invention have been described, it will be apparent that many variations and modifications are possible without departing from the spirit and scope of the invention. For example, instead of using the high power system described above, it is possible to utilize the invention in connection with a low power system using several base stations. Many other variations are also possible. It is intended that the invention include such modifications, being limited only by the claims appended hereto.

What is claimed is:

1. A method of providing wireless access to a network comprising the steps of:

wirelessly transmitting an electromagnetic signal containing identification information from a user terminal to a base station;

assigning a predefined frequency range and a time slot for data transmission between the user terminal and the base station;

at the user terminal segmenting data of a first format into frames of a predetermined length and transmitting (the data) from the user terminal to the base station at the assigned frequency range and time slot;

at the base station, receiving the segmented data from the user terminal;

recombining the segmented data received from the user terminal into a first format and providing the recombined data to the network;

receiving data in the first format from the network at the base station, segmenting the received data from the network into the frames of the predetermined length, and transmitting the segmented data from the base station to the user terminal at a preassigned frequency range and time slot;

at the user terminal, receiving the segmented data from the base station; and recombining the segmented data received from the base station into the first format; and wherein data transmitted from the base station to the user terminal is allocated a larger portion of each of the frames than allocated to data which is transmitted from the user terminal to the base station.

2. The method of claim 1 wherein the first format comprises TCP/IP.

3. The method of claim 1 wherein the segmented data is transmitted and received in a Time Division Duplex format.

4. The method of claim 1 wherein the ratio per frame of data transmitted from the base station to the user terminal to data transmitted from the user terminal to the base station is four to one.

5. A method of providing wireless access to a network comprising the steps of:

wirelessly transmitting an electromagnetic signal containing identification information from a user terminal to a base station;

assigning a predefined frequency range and time slot for data transmission between the user terminal and the base station;

at the user terminal, segmenting the data of a first format into frames of a predetermined length and transmitting the data from the user terminal to the base station at the assigned frequency range and time slot;

at the base station, receiving the segmented data from the user terminal; and recombining the segmented data received from the user terminal into the first format and providing the recombined data to the network; and wherein the frequency range and time slot are assigned according to a likely number of users of the network, a likelihood of the users of the network actively communicating information at a given time, and a likelihood of the users transmitting versus receiving data.

6. The method of claim 5 wherein the likelihood of the users transmitting versus receiving data is one to four.

7. The method of claim 6 wherein the likely number of users is ⅛ the number of potential users.

8. A system for providing wireless access to a network comprising:

means for wirelessly transmitting an electromagnetic signal containing identification information from a user terminal to a base station;

means for assigning a predefined frequency range and time slot for data transmission between the user terminal and the base station;

means for segmenting data of a first format at the user terminal into frames of a predetermined length and for transmitting the data from the user terminal to the base station at the assigned frequency range and time slot;

means for receiving the segmented data from the user terminal at the base station;

means for recombining the segmented data received from the user terminal into the first format and providing the recombined data to a network;

means for receiving the data in a first format from the network and for segmenting at the base station the received data from the network into the frames of the predetermined length and for transmitting the segmented data from the base station to the user terminal at a preassigned frequency range and time slot; and means for recombining the segmented data received from the base station into the first format; and wherein data transmitted from the base station to the user terminal is allocated a larger portion of each of the frames than allocated to data which is transmitted from the user terminal to the base station.

9. The system of claim 8 wherein the segmented data is transmitted and received in a Time Division Duplex format.

10. The system of claim 8 wherein the ratio per frame of data transmitted from the base station to the user terminal to data transmitted from the user terminal to the base station is four to one.

11. A system for providing wireless access to a network comprising:

means for wirelessly transmitting an electromagnetic signal containing identification information from a user terminal to a base station;

means for assigning a predefined frequency range and time slot for data transmission between the user terminal and the base station;

means for segmenting data of a first format at the user station into frames of a predetermined length and for transmitting the data from the user terminal to the base station at the assigned frequency range and time slot;

means for receiving the segmented data from the user terminal at the base station; and means for recombining the segmented data received from the user terminal into the first format and providing the recombined data to a network; and wherein the frequency range and time slot are assigned according to a likely number of users of the network, a likelihood of the users of the network actively communicating information at a given time, and a likelihood of the users transmitting versus receiving data.

12. The system of claim 11 wherein the likelihood of the users transmitting versus receiving data is one to four.

13. The system of claim 11 wherein the likely number of users is ⅛ the number of potential users.

* * * * *